(12) United States Patent
Zhou et al.

(10) Patent No.: US 7,831,074 B2
(45) Date of Patent: Nov. 9, 2010

(54) SYSTEM AND METHOD FOR USING A SIMILARITY FUNCTION TO PERFORM APPEARANCE MATCHING IN IMAGE PAIRS

(75) Inventors: Shaohua Kevin Zhou, Plainsboro, NJ (US); Jie Shao, Sunnyvale, CA (US); Jonathan Dowdall, Houston, TX (US); Adrian Barbu, Plainsboro, NJ (US); Bogdan Georgescu, Princeton, NJ (US); Dorin Comaniciu, Princeton Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 1065 days.

(21) Appl. No.: 11/539,989

(22) Filed: Oct. 10, 2006

(65) Prior Publication Data

US 2007/0237370 A1 Oct. 11, 2007

Related U.S. Application Data

(60) Provisional application No. 60/726,084, filed on Oct. 12, 2005.

(51) Int. Cl.
*G06K 9/00* (2006.01)
*G06K 9/62* (2006.01)
*H04N 5/225* (2006.01)

(52) U.S. Cl. .................. 382/128; 382/103; 382/107; 382/155; 382/159; 348/169

(58) Field of Classification Search .............. 382/128
See application file for complete search history.

(56) References Cited

U.S. PATENT DOCUMENTS 6,249,594 B1 * 6/2001 Hibbard ................. 382/128

7,343,031 B2 * 3/2008 Pedrizzetti et al. ......... 382/128
2002/0072674 A1 * 6/2002 Criton et al. ............... 600/454

OTHER PUBLICATIONS

Bardinet et al., "Tracking and Motion Analysis of the Left Ventricle with Deformable Superquadrics", Medical Image Analysis, vol. 1, No. 2, 1996, pp. 129-149.*
Williams et al., "Sparse Bayesian Learning for Efficient Visual Tracking", IEEE Transactions of Pattern Analysis and Machine Intelligence, vol. 27, No. 8, Aug. 2005, pp. 1292-1304.*

* cited by examiner

*Primary Examiner*—Matthew C Bella
*Assistant Examiner*—Jose M Torres

(57) ABSTRACT

The present invention is directed to a method for populating a database with a set of images of an anatomical structure. The database is used to perform appearance matching in image pairs of the anatomical structure. A set of image pairs of anatomical structures is received, where each image pair is annotated with a plurality of location-sensitive regions that identify a particular aspect of the anatomical structure. Weak learners are iteratively selected and an image patch is identified. A boosting process is used to identify a strong classifier based on responses to the weak learners applied to the identified image patch for each image pair. The responses comprise a feature response and a location response associated with the image patch. Positive and negative image pairs are generated. The positive and negative image pairs are used to learn a similarity function. The learned similarity function and iteratively selected weak learners are stored in the database.

4 Claims, 9 Drawing Sheets

Two-class LogitBoost (positive – y=1, negative – y=0)

0. Input: (i) Training data $\{x_i, i = 1, 2, \ldots, N\}$ and their corresponding class labels $\{y_i, i = 1, 2, \ldots, N\}$. (ii) The structural space $\mathcal{F}$.

1. Start with weights $w_i = 1/N, i = 1, 2, \ldots, N, F(x) = 0$, and probability estimates $p(x_i) = 1/2$.

2. Repeat for $m = 1, 2, \ldots, M$:

* (a) Compute working responses and weights.

$$z_i = \frac{y_i - p(x_i)}{p(x_i)(1 - p(x_i))} \quad (7)$$

$$w_i = p(x_i)(1 - p(x_i)). \quad (8)$$

* (b) Fit the function $f_m(x)$ by a weighted least-squares (LS) regression of $z_i$ to $x_i$ with weights $w_i$.

$$f_m(x) = \arg\min_{f(x) \in \mathcal{F}} \sum_{i=1}^{N} w_i(z_i - f(x_i))^2. \quad (9)$$

* (c) Update $F(x) \leftarrow F(x) + \frac{1}{2}f_m(x)$ and $p(x)$ via $$p(x) = \frac{\exp(F(x))}{\exp(F(x)) + \exp(-F(x))}. \quad (10)$$

3. Output the classifier $\mathrm{sign}[F(x)]$.

FIG. 3

SYSTEM AND METHOD FOR USING A SIMILARITY FUNCTION TO PERFORM APPEARANCE MATCHING IN IMAGE PAIRS

CROSS REFERENCE TO RELATED APPLICATION

This application claims the benefit of U.S. Provisional Application Ser. No. 60/726,084, filed on Oct. 12, 2005, which is incorporated by reference in its entirety.

FIELD OF THE INVENTION

The present invention is directed to a system and method for using a similarity function to perform appearance matching in image pairs, and more particularly, to a system and method for performing motion estimation of an anatomical structure using a boosted discriminative similarity function.

BACKGROUND OF THE INVENTION

It is very common during medical examinations for medical imaging systems (e.g., ultrasound imaging systems) to be used for the detection and diagnosis of abnormalities associated with anatomical structures (e.g., organs such as the heart). Many times, the images are evaluated by a medical expert (e.g., a physician or medical technician) who is trained to recognize characteristics in the images which could indicate an abnormality associated with the anatomical structure or a healthy anatomical structure.

Because of the advancements in computer technology, most computers can easily process large amounts of data and perform extensive computations that can enhance the quality of the obtained images. Furthermore, image processing can be used as a tool to assist in the analysis of the images. Efficient detection of anatomical structures or objects of interest in an image is an important tool in the further analysis of that structure. Many times abnormalities in the shape of an anatomical structure or changes of such a shape through time (e.g., a beating heart or a breathing lung) indicate a tumor or various diseases (e.g., dilation or ischemia of the heart muscle).

Motion estimation is fundamental to computer vision. Underlying any motion estimation method are two principles; similarity function and spatiotemporal smoothing. Known approaches which use similarity functions for motion estimation can be categorized as (i) intensity-based, (ii) histogram-based, and (iii) application specific. Intensity based similarity functions include sum of square distance (SSD), sum of absolute distance (SAD) and normalized cross correlation (NCC).

Motion estimation is very useful in medical imaging application to identify changes in features of an anatomical structure. Analysis of these features can be used to diagnose the health of the anatomical structure and the identification of diseases. For applications where the observed appearance undergoes complex changes in an application-dependent fashion, motion estimation is challenging due to lacking an appropriate similarity function. Known similarity functions are mostly generic and inadequate for handling complex appearance variations.

For example, consider a stress echocardiographic video (stress echo) which is a series of 2D ultrasound images of the human heart captured after the patient undergoes exercise or takes special medicine. Wall motion analysis is used to characterize the functionality of the heart. More specifically, the motion of the endocardium of the left ventricle (LV) is measured. The LV endocardium presents severe appearance changes over a cardiac cycle due to nonrigid deformation, imaging artifacts like speckle noise and signal dropout, movement of papillary muscle (which is attached to the LV endocardium, but not a part of the wall), respiratory interferences, unnecessary probe movement, etc. When know similarity functions are applied to estimate the motion in the stress echo sequences, they are found to be ineffective. There is a need for a method for generating a discriminative similarity function which can effectively be used to perform motion estimation of anatomical structures in situations where appearance undergoes complex changes.

SUMMARY OF THE INVENTION

The present invention is directed to a method for populating a database with a set of images of an anatomical structure. The database is used to perform appearance matching in image pairs of the anatomical structure. A set of image pairs of anatomical structures is received, where each image pair is annotated with a plurality of location-sensitive regions that identify a particular aspect of the anatomical structure. Weak learners are iteratively selected and an image patch is identified. A boosting process is used to identify a strong classifier based on responses to the weak learners applied to the identified image patch for each image pair. The responses comprise a feature response and a location response associated with the image patch. Positive and negative image pairs are generated. The positive and negative image pairs are used to learn a similarity function. The learned similarity function and iteratively selected weak learners are stored in the database.

The present invention is also directed to a system and method for estimating the motion of an anatomical structure in a video sequence. A video sequence is received that comprises a plurality of sequential images of an anatomical structure. A first image in the video is initialized with a plurality of control points. A similarity function is used to identify the corresponding location in subsequent image frames of the video sequence. The identified locations are used as the motion tracking result of the anatomical structure.

The present invention is also directed to a method for registering two images of an anatomical structure. A pair of images of the anatomical structure is received. Each image in the image pair is annotated with a plurality of locations to be registered. A similarity function is used to match each of the annotated regions in a first image with the regions in a second image. The identified annotated regions are used to register the anatomical structure in the pair of images.

BRIEF DESCRIPTION OF THE DRAWINGS

Preferred embodiments of the present invention will be described below in more detail, wherein like reference numerals indicate like elements, with reference to the accompanying drawings:

FIG. 3 outlines a two-class LogitBoost algorithm in accordance with the present invention;

DETAILED DESCRIPTION

The present invention is directed to a method for using a discriminative similarity function to estimate the motion of an anatomical structure. An example where such a method would be utilized is for detecting regional wall motion abnormalities in the heart by detection and segmentation of the ventricle endocardial or epicardial borders through machine learning, or classification, and by identifying similar cases from annotated databases. It is to be understood by those skilled in the art that the present invention may be used in other applications where the presented discriminative similarity function is useful such as, but not limited to, registering a digitally reconstructed radiograph image to a fluoroscopy image. The present invention can also be used in 2 dimensional, 3 dimensional and 4 dimensional (3D+time) data analysis, such as medical analysis of anatomical structures such as the heart, lungs or tumors, which can be evolving over time.

Figure 1:
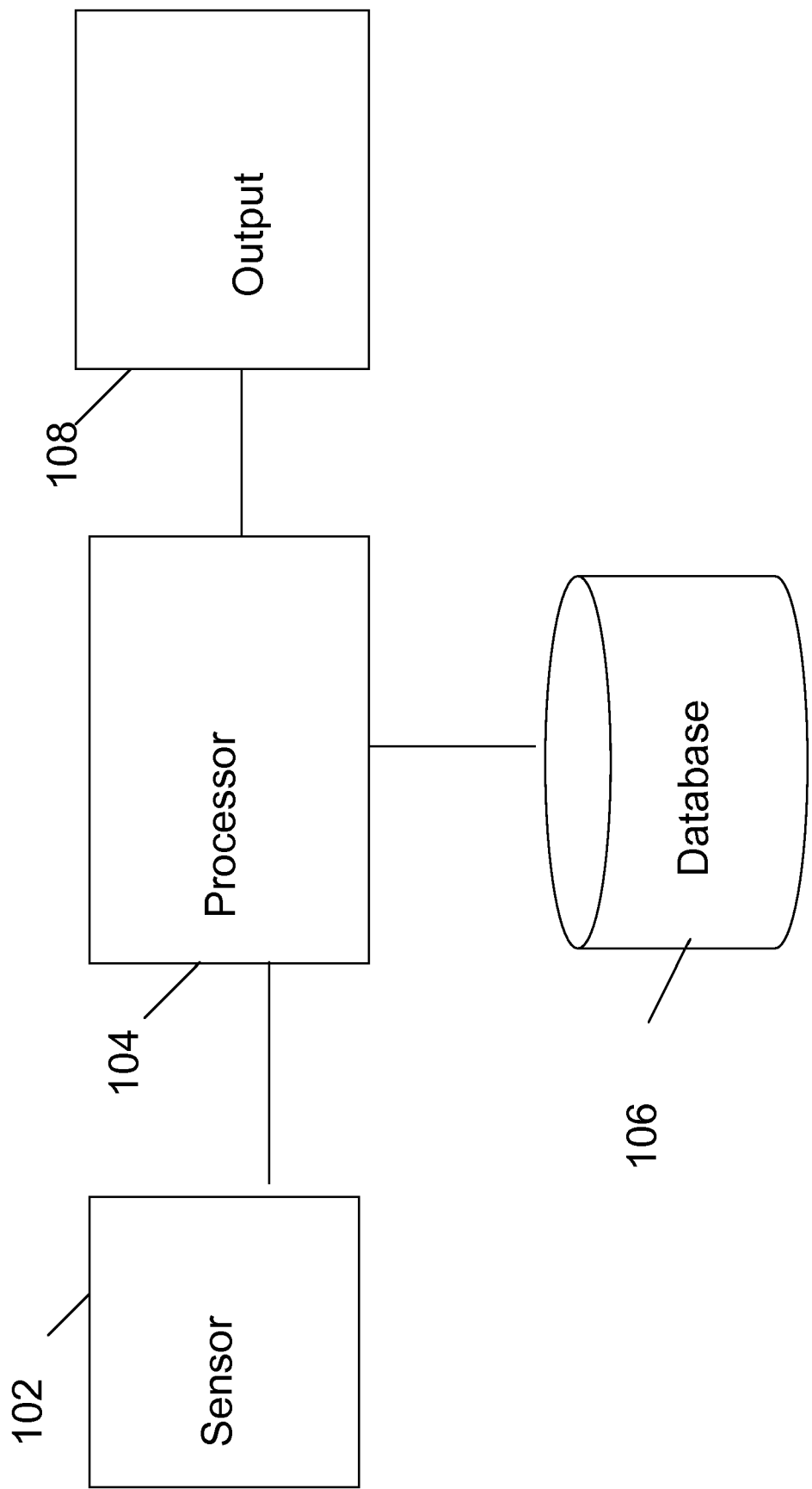
FIG. 1 illustrates an exemplary architecture of an echocardiograph system that uses a discriminative similarity function to estimate motion of an endocardial wall of a left ventricle in accordance with the present invention.

For purposes of describing the present invention, an example will be described for detecting the endocardial wall of the left ventricle of a human heart. FIG. 1 illustrates an exemplary architecture of an echocardiograph system that uses a method for detecting an endocardial wall of a left ventricle using appearance variations in accordance with the present invention. A medical sensor 102, such as an ultrasound transducer is used to perform an examination on a patient. The sensor 102 is used to obtain medical measurements consistent with a particular medical examination. For example, a patient experiencing heart problems may have an echocardiogram performed to help diagnose the particular heart ailment. An ultrasound system provides two-, three-, and four (3D+time)-dimensional images of the heart from various perspectives.

The information obtained by the sensor 102 is communicated to a processor 104 which may be a workstation or personal computer. The processor 104 converts the sensor data into an image that is communicated to display 108. The display 108 may also communicate other graphical information or tables of information relating to the image. In accordance with the present invention, the processor 104 is also provided with data representing an initial contour of the endocardial wall. The data may be provided manually by a user such as a physician or sonographer, or automatically by the processor 104. The contour comprises a series of individual points, the movement of which is tracked by the processor 104 and illustrated on display 108.

In addition to data from the medical sensor 102, the processor 104 may also receive other data inputs. For example, the processor may receive data from a database 106 associated with the processor 104. Such data may include subspace models that represent potential contour shapes for the endocardial wall. These subspace models may be images of left ventricles that are representative of a plurality of patients or may be computer generated models of contour shapes based on statistical information.

Figure 2:
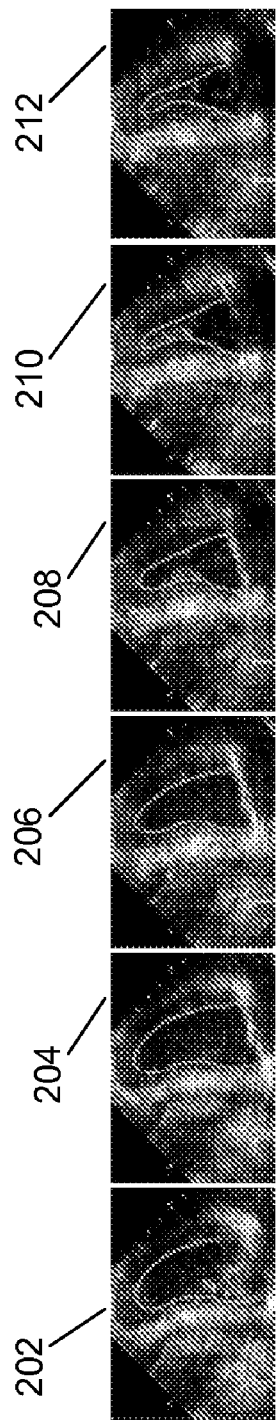
FIG. 2 illustrates an exemplary series of image frames from a stress echocardiographic video in accordance with the present invention.

An example of an application of the present invention is a stress echocardiographic video (stress echo), which is comprised of a series of two dimensional ultrasound images of the heart captured after a patient has undergone exercise or taken special medicine as shown in FIG. 2. Motion analysis is used to characterize the functionality of the heart. More specifically, the motion of the endocardium of the left ventricle (LV) is measured. As shown in image frames 202-212, the LV endocardium presents severe appearance changes over a cardiac cycle due to nonrigid deformation, imaging artifacts like speckle noise and signal dropout, movement of papillary muscle (which is attached to the LV endocardium but not a part of the wall), respiratory interferences, unnecessary probe movement, etc.

The present invention is directed to a discriminative similarity function that is based on an annotated database that exemplifies appearance variations. The present invention invokes a framework of boosting to learn a similarity function. Boosting iteratively selects weak learners to form a strong learner using an additive form: $F(x) = \sum_{f_m(x) \in F} f_m(x)$, where $F(x)$ is the strong learner, $f_m(x)$'s are the weak learners, and F is the structural space where the weak learners reside. Boosting has three key components: (i) structural space; (ii) noise model or cost function; and (iii) selection algorithm. Different variants of boosting depend upon different choices of the key components.

In accordance with the present invention, a boosting algorithm, such as LogitBoost, is used to selectively combine weak learners into one strong similarity function. The weak learners are associated with a Haar-like local rectangle feature to accommodate fast computation. The weak learner takes an image pair as input and uses the two feature responses collected from both images. The weak learners are constructed as nonparametric 2D piecewise constant functions of the two feature responses in order to strengthen the modeling power and accommodate fast evaluation. A location sensitive cascade training procedure is used which bootstraps negative responses for later stages of the cascade from the regions closer to positive responses. This allows viewing a large number of negative responses and steering the training process to yield lower training and testing errors.

LogitBoost directly minimizes a negative binomial log-likelihood, which is a natural choice for a binary classification problem. In accordance with an embodiment of the present invention, a two class LogitBoost algorithm is outlined in FIG. 3. The crucial step on the Logitboost algorithm is step 2(b) which requires fitting a weighted LS regression of $z_i$ to $x_i$ with weights $w_i$. The LogitBoost algorithm acts as a feature selection oracle: picking up from the structural space F the weak learner (or feature function) that minimizes its weighted LS cost∈(f).

In accordance with the present invention, a data point x is an image pair x=(I, I'). One obvious choice for the boosted similarity function s(I, I') is the probability of the class label y(I, I') being 1, that is s(I, I')=p(I, I'). A weak learner f(I, I') will now be defined. Given the fact that different similarity functions are effective for different local regions, weak learners are constructed based on Haar-like local rectangle features, whose rapid evaluation is enabled by the means of an integral image.

Figure 4:
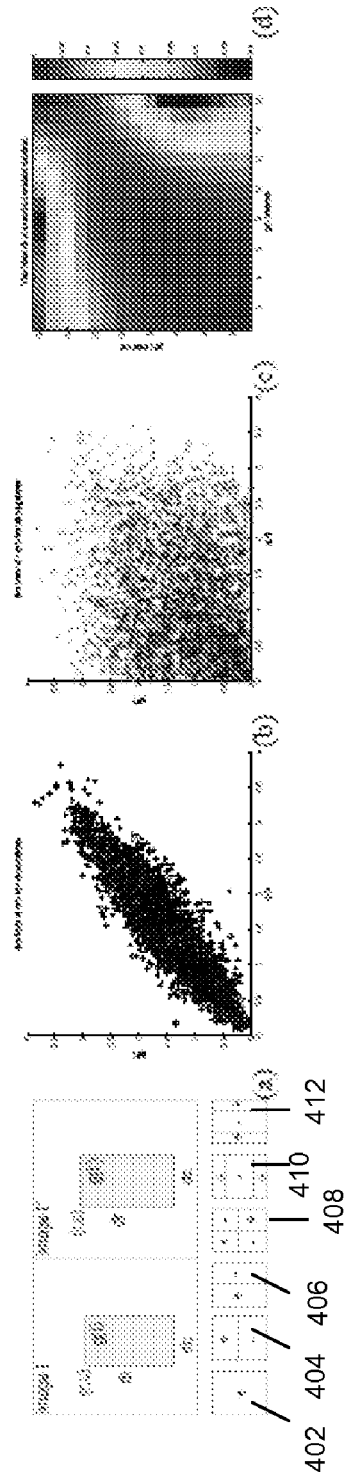
FIGS. 4(a)-4(d) illustrate weak similarity functions in accordance with the present invention.

A weak similarity function compares two local rectangle regions belonging to the images I and I', respectively. As illustrated in FIG. 4(a), the rectangle feature g is parameterized by (r, c, dr, dc, t) where (r,c) is the starting point of the rectangle, (dr, dc) is the height and width, and t is the feature type. There are six feature types 402-412 as shown in FIG. 4(a). Given a rectangle feature g and an image pair (I, I'), two feature responses g(I) and g(I') are computed from the two integral images associated with I and I' respectively.

The 2D feature space of the two feature responses g(I) and g(I') are focused on to model the weak learner f(I, I') as a 2D piecewise constant (PWC) function of g(I) and g(I'), which has the following form.

$$f(I, I') = \sum_{j=1}^{J} \sum_{k=1}^{K} \alpha_{jk} [g(I) \in T_j]^{\wedge} [g(I') \in T'_k] \quad (1)$$

where $[\pi]$ is an indicator function of the predicate $\pi$ and $\alpha_{jk}$ is the constant associated with the region $R_{jk}$. A tessellation of the 2D feature space into non-overlapping regions $\{R_{jk} = T_j \cap T'_k\}_{j,k=1}^{J,K}$ is used, where $\{T_j\}_{j=1}^{J}$ and $\{T'_k\}_{k=1}^{K}$ are the J and K non-overlapping intervals for the feature response g(I) and g(I') respectively. The interval boundary points are empirically determined by uniformly dividing the feature responses.

Given a weak learner f that is associated with a feature g, the optimal weight $\alpha_{jk}$ that minimizes the weighted LS cost$\in$ (f) is the weighted response z of all data points falling into the region $R_{jk}$.

$$\alpha_{jk} = \frac{\sum_{i=1}^{N} w_i z_i [g(I_i) \in T_j]^{\wedge} [g(I'_i) \in T'_k]}{\sum_{i=1}^{N} w_i [g(I_i) \in T_j]^{\wedge} [g(I'_i) \in T'_k]} \quad (2)$$

where $(I_i, I'_i)$ is the $i^{th}$ training image pair. FIGS. 4(b)-(d) illustrate the fitting process. FIG. 4(b) visualizes the field of $w_i * z_i = y_i - p(x_i) = 1 - p(x_i)$ for all positives, where the color intensity corresponds to w*z; the redder the plus sign is, the less likely the data point x is positive. The diagonal structure in FIG. 4(b) shows that the two feature responses of the positives are roughly the same.

FIG. 4(c) visualized the field of $-w_i * z_i = p(x_i)$ for all negatives; the greener the circle is, the less likely the data point x is negative. As shown in FIG. 4(c), the negatives are characterized by a widely dispersed nature. FIG. 4(d) shows the fitted 2D PWC function: the constant coefficients $\alpha_{jk}$ along the diagonal lines are high, while off-diagonal ones are low. For step 2(a) in FIG. 3, the weak functions $f$ with the smallest weight LS cost $\epsilon(f)$ is selected.

The use of nonparametric 2D PWC functions as weak learners is beneficial. Take the 1D case for example: 1D simple regression stumps that binarize the feature responses are often used as weak learners. It is easy to verify that any 1D PWC function can be constructed by combining multiple 1D simple regression stumps. The similar holds true for the 2D case. Such a combination strengthens the modeling power of weak learners and consequently accelerates the training process. It is found that the learning time is almost inversely proportional to the number of thresholds used in the weak learner. While it may be perceived that this brings the increased risk of overfitting, boosting has the ability to combat overfitting (in terms of classification) even when the weak learner overfits. Further, the fields of w*z and w are smoothed before taking the division in equation (2) to ameliorate the overfitting of the weak learner itself.

Boosting training requires huge memory space because one has to evaluate a huge matrix, whose row corresponds to the local rectangle feature and whose column to the training image pair. It is desired to store such a matrix in the memory in order to speed up the training process. Typically, the number of rectangle features is huge (e.g., more than 150 K for a 24×24 images by an exhaustive construction. In accordance with the present invention, in order to learn the PWC function, only the interval index needs to be stored in the memory. In practice, 16 intervals are used, which implies that an unsigned char is enough to store two indices, leading to a moderate memory requirement of about 400 MB.

Figure 5:
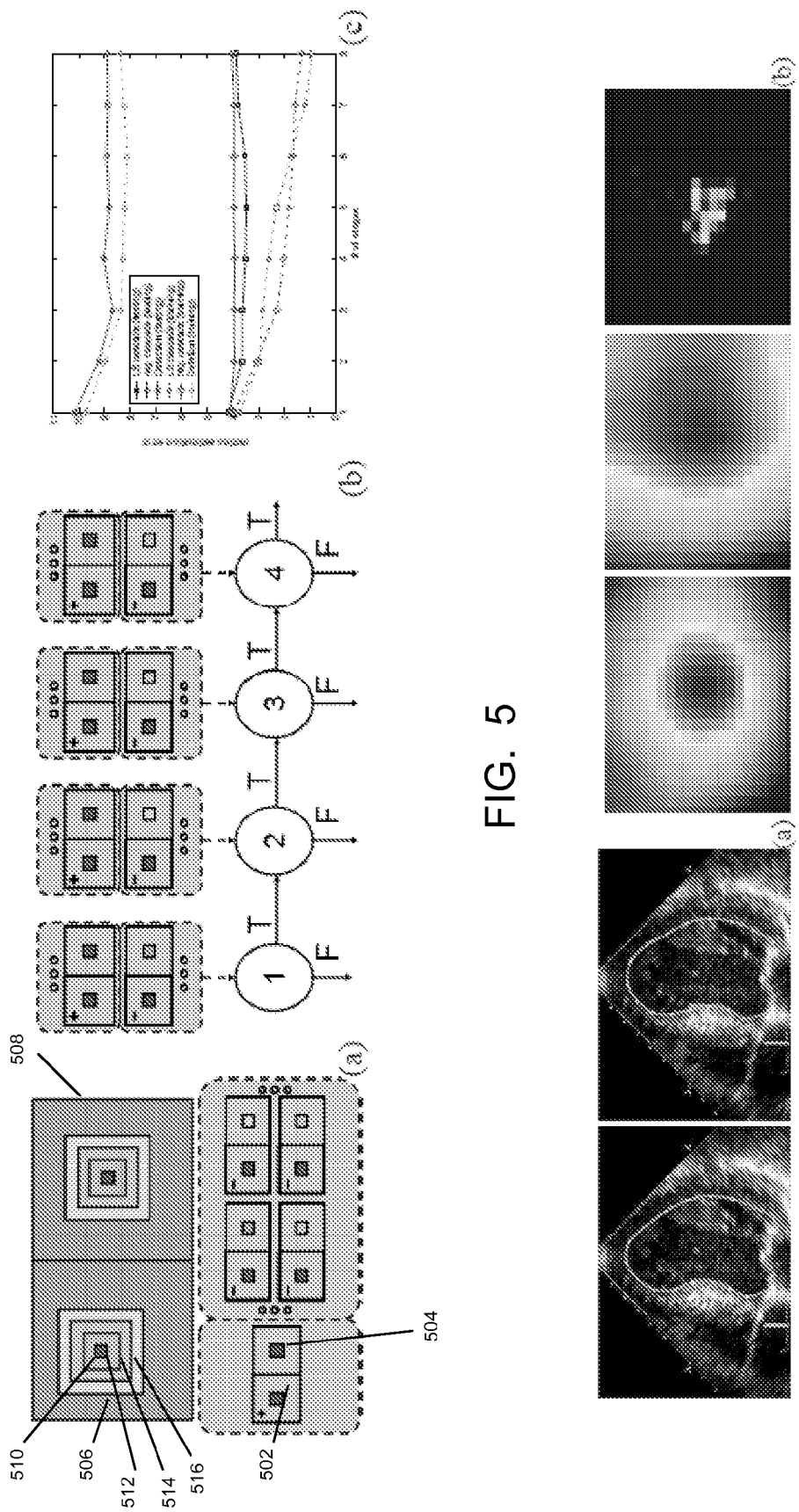
FIGS. 5(a)-5(c) illustrate location sensitive cascade training in accordance with the present invention.

Generating positives and negatives, which are pairs of images, from annotated videos is illustrated in FIG. 5(a). Given a pair of two successive frames (the left and the right images 506, 508 in FIG. 5(a)), it contributes one positive by cropping two image patches centered at the target pixel (denoted by 502, 504) from the left and right frames 506, 508, respectively.

To generate negatives, the same image patch cropped from the left frame 506, i.e., centered at the target pixel, is maintained but the center of the image patch cropped from the right frame 508 is forced away from the target pixel. Therefore, the negative possesses an additional location parameter that measures its distance to the target. Obviously, the number of negatives is theoretically infinite if a non-integer pixel grid is used. To cover as many negatives as possible, a cascade of strong classifiers is trained, which is a degenerate decision tree. To train the strong classifier at a later stage, the same set of positives is maintained but a new set of negatives is bootstrapped that pass all previous strong classifiers (i.e., false positives). During scanning all test subwindows, the cascade structure is able to eliminate the negatives quickly.

The motion estimation accuracy is directly related to the selection of the negatives. On one hand, if the negatives are far away from the positives, it is easy to learn a perfect classifier but the accuracy is not guaranteed. On the other hand, if the negatives are too close to the positives, the accuracy is improved but it is hard to train a flawless classifier and might step into the zone of overfitting because the training positives and negatives are too confusing. Often in medical applications, different experts disagree with each other about the ground truth; thus, motion estimation only needs to be addressed in a pre-specified precision. To this end, a location-sensitive training procedure is designed that takes into account the location factor of the negatives.

The pixels of a video frame are divided into several regions according to their distances to the target pixel as illustrated in FIG. 5(a), where the target pixel 510 is surrounded by regions 512-516. While preserving the features of the regular cascade training, the location-sensitive cascade training imposes an additional constraint; the negatives for several consecutive stages of the cascade are restricted to be from the same region. Further, the later stages use negatives closer to the positives; however, negative bootstrapping is still applied even across the boundary of the stages using negatives from different regions. The procedure is graphically illustrated in FIG. 5(b).

FIG. 5(c) displays a performance comparison among location-sensitive cascade, regular cascade and detection.

In accordance with the present invention, the cascade output must be converted into a similarity function that measures the confidence of being positive. If a cascade comprises L stages and stage l has a strong classifier $F_l(I, I')$ that can be convened to posterior probability $s_l(I, I')$ using Eq. (10) of FIG. 3. Given the degenerate nature of the cascade, the final similarity function is approximated as:

$$s(I, I') \approx \prod_{l=1}^{L} s_l(I, I') = \prod_{l=1}^{L} \frac{\exp(2F_l(I, I'))}{\exp(2F_l(I, I')) + 1} \quad (3)$$

For the negatives rejected at an early stage L'<L, these are no longer evaluated at later stages and a dummy probability $s_l(I, I')=\epsilon$; l>L', where $\epsilon<0.5$ is a small amount is set.

Figure 6:
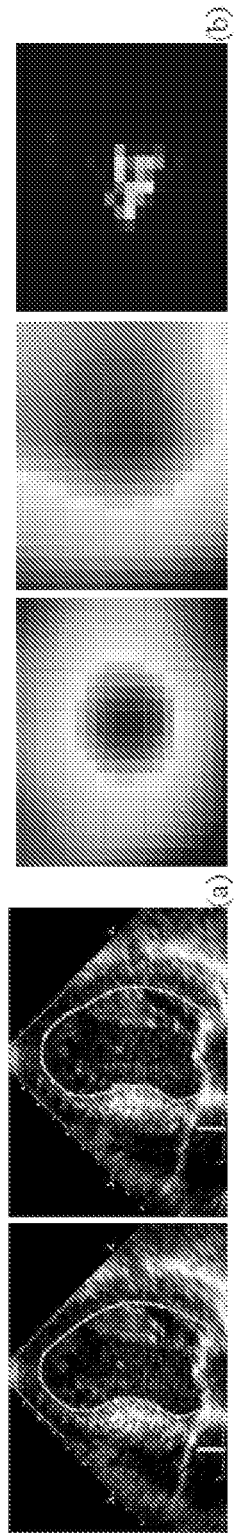
FIGS. 6(a) and 6(b) illustrate a pair of successive image frames of a human heart and a method for estimating motion in accordance with the present invention.

An example of an implementation of the method of the present invention will now be described using echocardiographic sequences of ultrasound images of a human heart. As shown in FIG. 6(a), the LV endocardial wall is parameterized by 17 landmark points along the contour and then the whole contour is interpolated using a cubic spline. Apical four chamber (A4C) views of the echo sequences are used. The A4C view is a standard cardiac view used in clinical practice. In accordance with example, 339 sequences are used that provided 3162 frame pairs. The 339 sequences are randomly divided into two sets; the training set includes 270 sequences with 2543 image pairs and the test set includes 69 sequences having 619 image pairs. To reduce appearance variation, each video frame is aligned with respect to a mean shape using a rigid similarity transform.

A motion vector of the left annulus point, i.e., the left end point of the LV endocardium is estimated that is characterized by drastic appearance changes mainly due to valve movement. Given the correct left image patch, a searching neighborhood is exhaustively searched for the best right image patch that maximizes the similarity function. The motion vector is estimated for all test image pairs and the estimation error is measured in terms of absolute displacement. For an image pair, the size of the left and right images are set as 35×35 and the searching window N as [−21, 21]×[−21, 21].

Location-sensitive cascade training is used to learn a cascade of eight stages. The whole search neighborhood is then divided into eight regions depending on their closeness to the center: specifically, they are $R_1=\{21, 20, 19\}$, $R_2=\{8, 17, 16\}$, $R_3=\{15, 14, 13\}$, $R_4=\{12, 11\}$, $R_5=\{10, 9\}$, $R_6=\{8, 7\}$, $R_7=\{6, 5\}$, $R_8=\{4, 3\}$ pixels away from the center. To train the $i^{th}$ stage of strong classifier, negatives are selected out from region $R_i$. For comparison, a regular cascade is trained by randomly selecting out negatives at least three pixels away from the ground truth. FIG. 5(c) plots the curves of the training and test errors against the number of cascade stages. The location-sensitive cascade training consistently reduces the test error till overfitting is reached; while the regular cascade training saturates the performance even at the second stage. Apart from that it yields lower training and test errors, the location-sensitive cascade training provides a steerable way to control the training process.

FIG. 6(b) displays the response maps of different similarity functions for the sample pair of frames in FIG. 6(a). The response map of the BoostMotion is peaked around the ground truth with a compact support region. Most of the off-center pixels are black because they are rejected by early stages of the cascade.

In a second example, a naïve tracking algorithm is invoked that estimates motion vectors frame by frame to perform echocardiography tracking. Regular echocardiographic sequences of apical two chamber (A2C) views are used where appearance changes are less pronounced than the stress echo. The A2C view is another canonical echo view used in clinical practice. The image sequences are randomly divided into a training set and a test set. The alignment is conducted in a recursive fashion.

Figure 7:
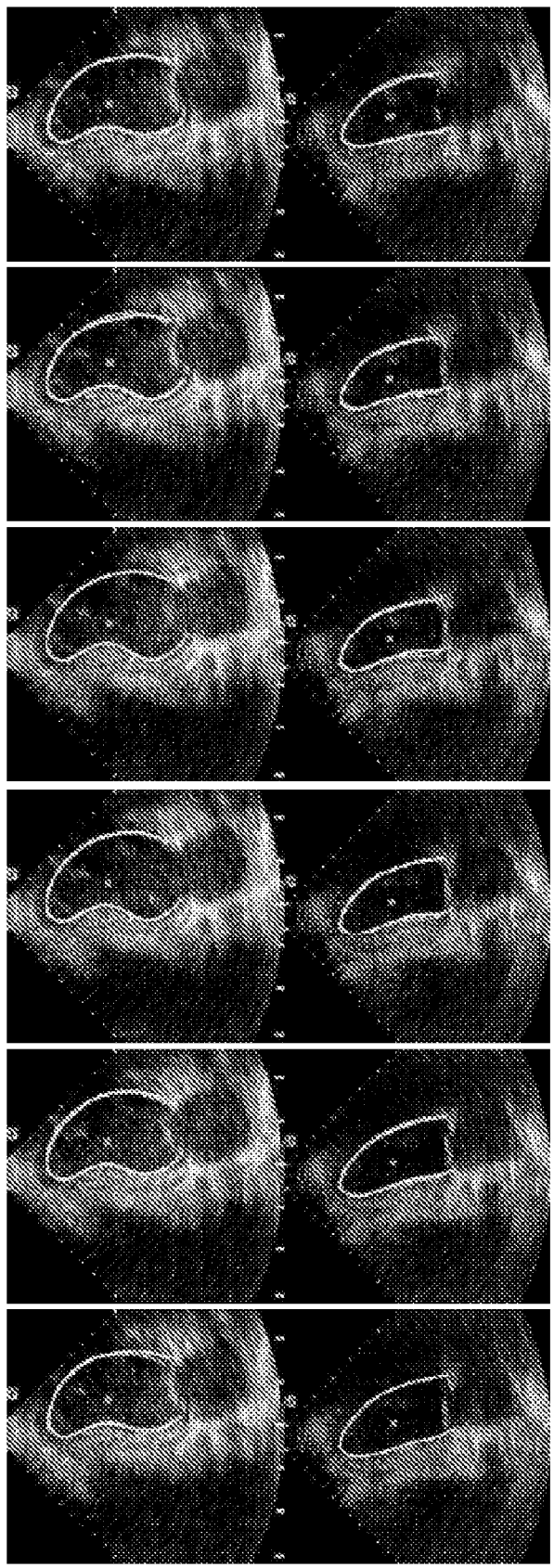
FIG. 7 illustrates tracking results of sample frames from two echocardiographic sequences in accordance with the present invention.

To calibrate the contour tracking accuracy, the proximity between two contours needs to be measured. The average distance of the landmark displacement is used which is defined as $$\sum_{i=1}^{17} |p_i - g_i|^2 / 17,$$

where $p_i$ and $g_i$ are $i^{th}$ landmark points on the probe contour and the ground truth contour, respectively. Some of the tracking examples are illustrated in FIG. 7.

Another area in which the method of the present invention can be used is that of radiation therapy treatment. Radiation therapy treatment is an effective tool in the battle against cancer. One of the main considerations when using radiation therapy treatment is the amount of the patient's healthy tissue that is exposed to radiation. Many investigations into improving the accuracy of this technology have enhanced its benefit as a cancer treatment tool. One such area is the use of digitally reconstructed radiographs (DRRs) to aid in the evaluation of real time fluoroscopy during radiation treatment. By effectively utilizing annotated DRR images, the number of fluoroscopic images needed to accurately register the tumor can be decreased. This is accomplished by conducting a DRR-fluoroscopy registration.

Figure 8:
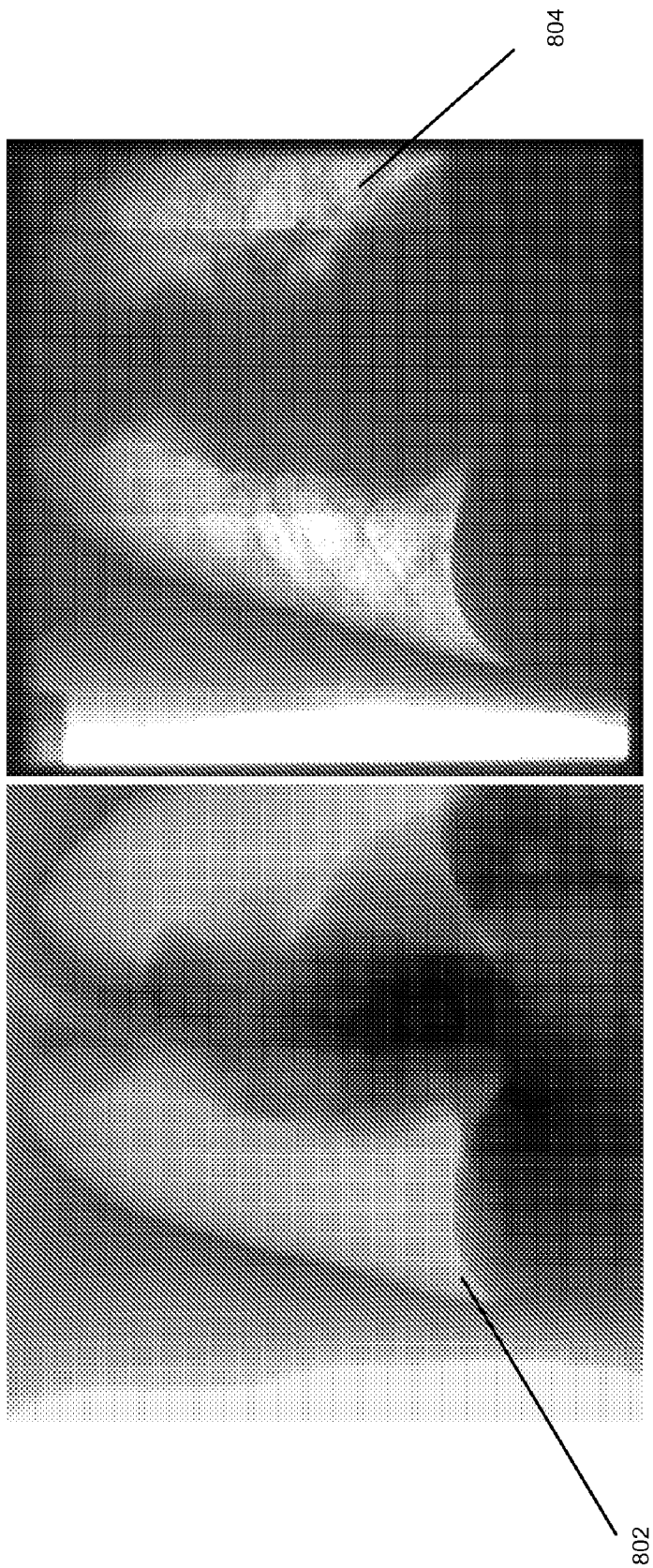
FIG. 8 illustrates a DRR image and a first frame of a fluoroscopy image to be matched in accordance with the present invention.
Figure 9:
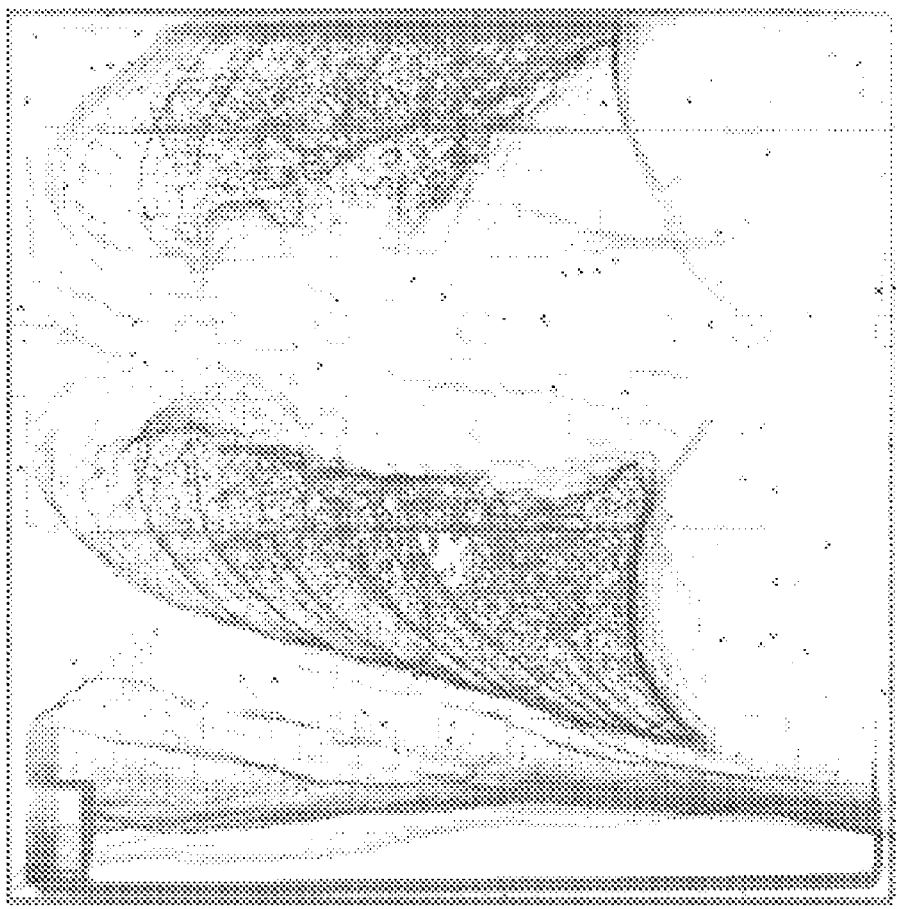
FIG. 9 illustrates an example of an overlay of a DRR and fluoroscopy image.

In accordance with another embodiment of the present invention, a trained similarity measure can be used to take as input a digitally reconstructed radiograph (DRR) image 802 and match it to a fluoroscopy image 804 as shown in FIG. 8. This can be a challenging problem, because depending on the reconstruction method used, the DRR can deviate substantially from the fluoroscopy images as shown in FIG. 9. In accordance with the present invention, a paired classifier is used. In paired classification, the classifier is trained using pairs of samples instead of having a single positive or negative sample. This allows a DRR image sub-region, the first half of a pair, to be matched to its corresponding fluoroscopy image sub-region, the second half of a pair.

Figure 10:
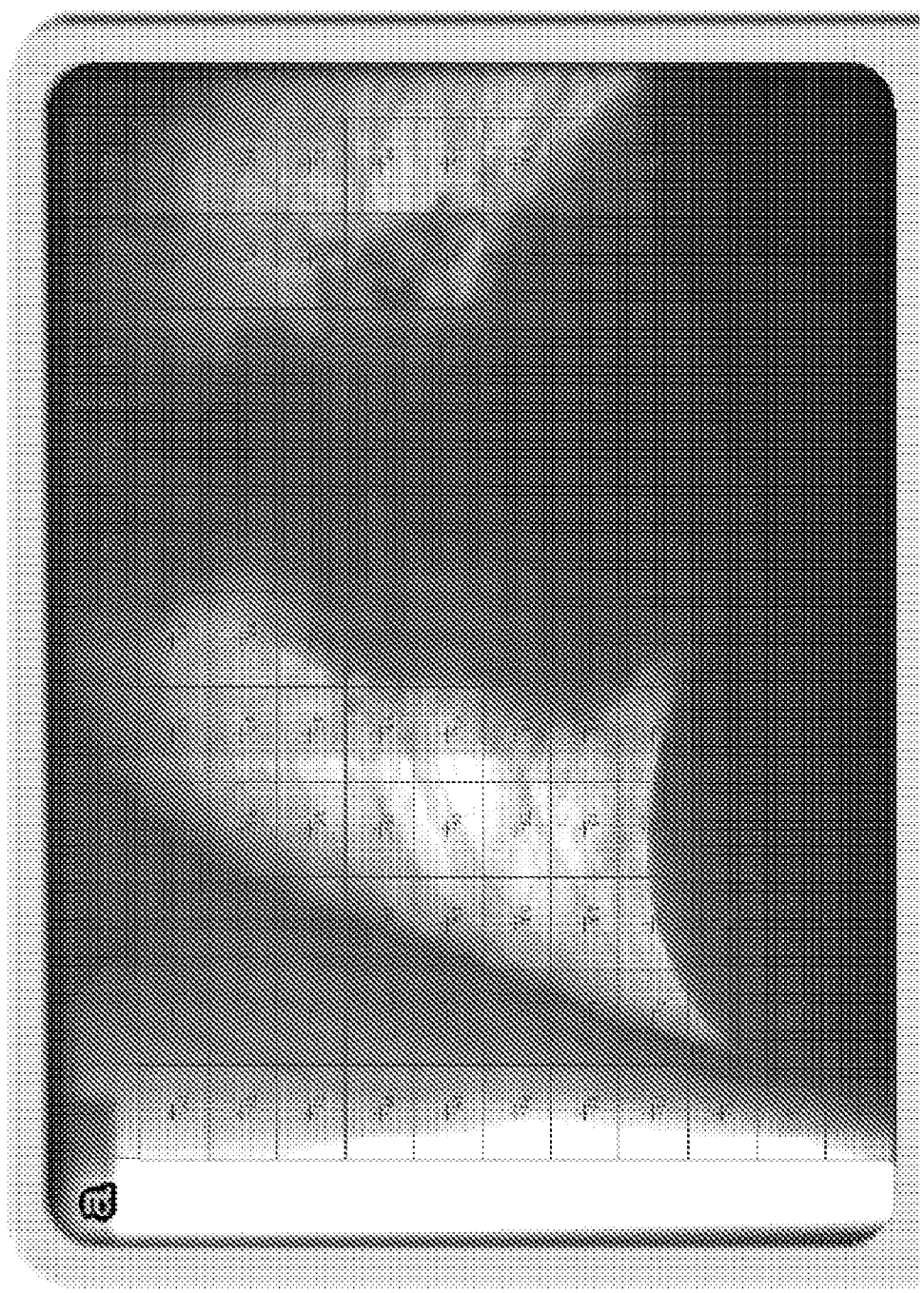
FIG. 10 illustrates a fluoroscopy image of a lung in its initial position that includes annotated regions in accordance with the present invention.
Figure 11:
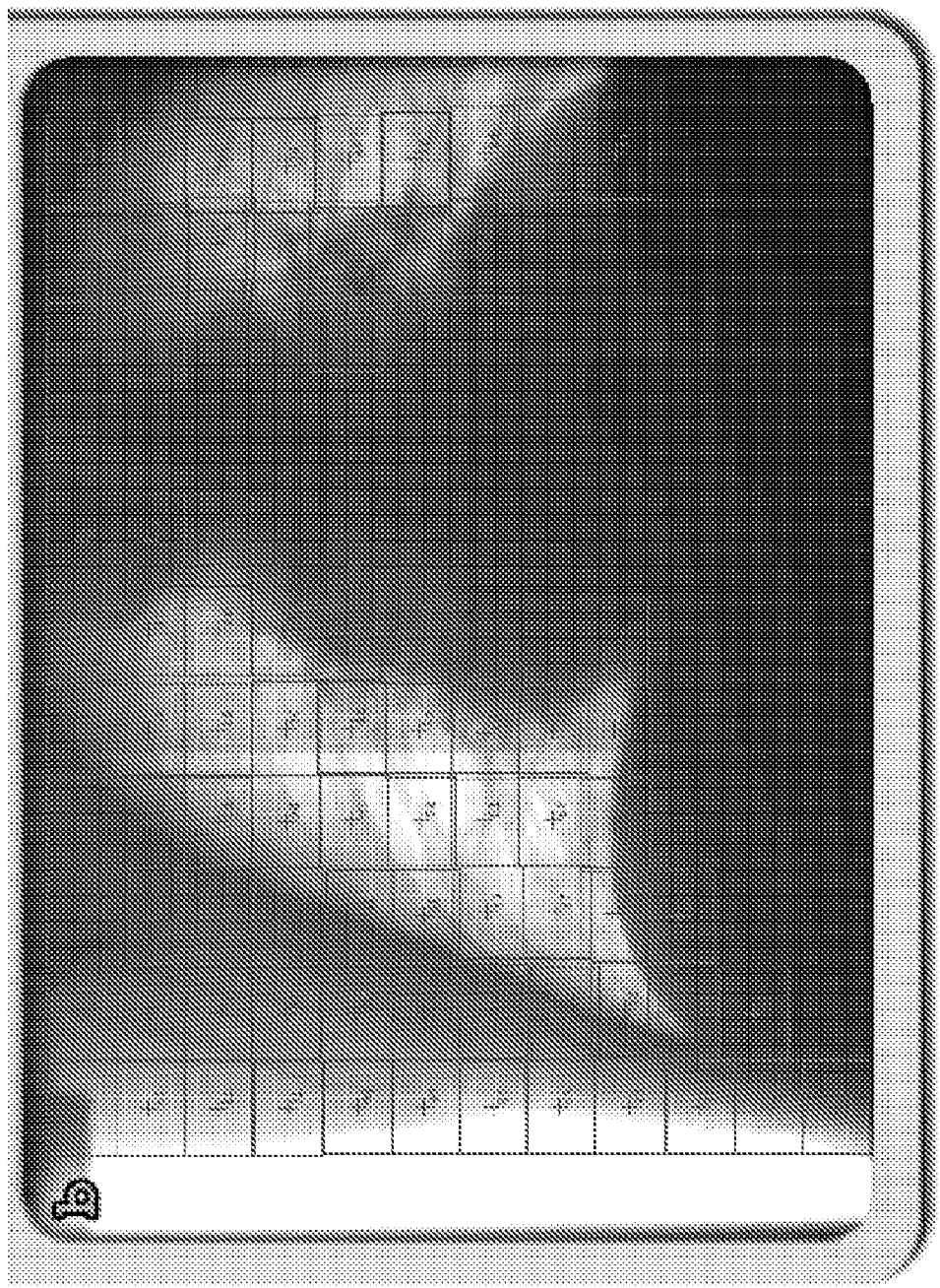
FIG. 11 illustrates the lung of FIG. 10 in a subsequent position which has been annotated to reflect the motion of each of the annotated regions in FIG. 10 in accordance with the present invention.

The input DRR and fluoroscopy data can be annotated onto the image as shown in FIG. 10. FIG. 10 illustrates a first frame of an image video stream of a lung in which all of the annotated regions are shown in their initial position. FIG. 11 illustrates a subsequent frame in the video image stream in which the annotated regions have been positioned to reflect the motion of the respective image regions.

An example of how a DRR-fluoroscopy registration may be performed will now be described. A data set is obtained which comprises a sequence of fluoroscopy images and their corresponding DRR images. Each image in the data set is annotated at selected locations as illustrated in FIGS. 10 and 11. Each annotation location is manually positioned in the DRR and its respective matching locations in each frame of the fluoroscopy sequence.

To learn a similarity function that takes a pair image patches as input, whose first part is the DRR image sub-region and the second part is the corresponding fluoroscopy image sub-region, paired samples are generated using annotated regions that are used for training. To allow robust matching, the center of the right half is perturbed within one pixel leading to 9 paired images. Weak learners are used to generate a strong classifier to help identify positive and negative image pairs.

Having described embodiments for a method for using a discriminative similarity function to estimate the motion of an anatomical structure, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for estimating the motion of an anatomical structure in a video sequence, the method comprising the steps of:
   receiving a video sequence comprising a plurality of sequential images of an anatomical structure;
   initializing a first image in the video with a plurality of control points that are associated with a corresponding image patch;
   using a boosting algorithm to learn a similarity function by selectively combining weak learners that are associated with the image patch;
   using the learned similarity function to identify a location in subsequent image frames of the video sequence that corresponds to the control points; and
   using the identified location to track motion of the anatomical structure within the video sequence,
   wherein the above steps are performed using a computer.

2. The method of claim 1 wherein the anatomical structure is a left ventricle and the plurality of control points identify a contour of the ventricle.

3. A system for estimating the motion of an anatomical structure, the system comprising:
   a database that stores a set of image pairs of anatomical structures, each image pair being annotated with a plurality of location-sensitive regions that identify a particular aspect of the anatomical structure;
   a processor that receives an input video sequence comprising a plurality of sequential images of an anatomical structure, the processor performing the following steps:
   initializing a first image in the video with a plurality of control points that are associated with a corresponding image patch;
   using a boosting algorithm to learn a similarity function by selectively combining weak learners that are associated with the image patch;
   using the learned similarity function to identify a location in subsequent image frames of the video sequence that corresponds to the control points; and
   using the identified location to track motion of the anatomical structure within the video sequence; and
   a display to display the tracked anatomical structure.

4. The system of claim 3 wherein the anatomical structure is a left ventricle and the plurality of control points identify a contour of the ventricle.

* * * * *